US012734105B2

(12) United States Patent
Leng

(10) Patent No.: US 12,734,105 B2
(45) Date of Patent: Sep. 15, 2026

(54) MASSAGE DEVICE

(71) Applicants: Shenzhen Zhonghongtian Technology Co., Ltd., Shenzhen (CN); Dongguan Aibei Health Products Co., Ltd., Dongguan (CN)

(72) Inventor: Donggen Leng, Dongguan (CN)

(73) Assignees: Shenzhen Zhonghongtian Technology Co., Ltd., Shenzhen (CN); Dongguan Aibel Health Products Co., Ltd., Dongguan (CN)

( * ) Notice: Subject to any disclaimer, the term of this patent is extended or adjusted under 35 U.S.C. 154(b) by 0 days.

(21) Appl. No.: 19/385,662

(22) Filed: Nov. 11, 2025

(65) Prior Publication Data

US 2026/0130818 A1 May 14, 2026

(30) Foreign Application Priority Data

Nov. 11, 2024 (CN) ........................ 202422739892.9

(51) Int. Cl.
*A61H 19/00* (2006.01)

(52) U.S. Cl.
CPC .................................... *A61H 19/34* (2013.01)

(58) Field of Classification Search
CPC ...................................................... A61H 19/34
See application file for complete search history.

(56) References Cited

U.S. PATENT DOCUMENTS

| | | | | |
|---|---|---|---|---|
| 2024/0099930 A1* | 3/2024 | Luo | ........................ | A61H 19/32 |
| 2025/0017814 A1* | 1/2025 | Li | ........................ | A61H 19/44 |
| 2025/0161150 A1* | 5/2025 | Wang | ........................ | A61H 19/32 |
| 2025/0177240 A1* | 6/2025 | Tu | ........................ | A61H 21/00 |
| 2025/0387291 A1* | 12/2025 | Yan | ........................ | A61H 7/005 |

* cited by examiner

*Primary Examiner* — Thaddeus B Cox

(57) ABSTRACT

A massage device includes a massage assembly and a driving assembly connected to the massage assembly. The driving assembly includes a driving motor with an output shaft; a rotary member mounted around the driving motor and connected to the output shaft of the driving motor, a first sliding groove being defined in an outer circumferential wall of the rotary member and extending spirally; and a fixed member mounted around the rotary member, a first sliding portion extending from the fixed member and engaged into the first sliding groove, the rotary member being movable and rotatable relative to the fixed member.

20 Claims, 9 Drawing Sheets

MASSAGE DEVICE

CROSS-REFERENCE TO RELATED APPLICATIONS

This application claims priority of Chinese Patent Application No. 202422739892.9, filed on Nov. 11, 2024, the entire contents of which are hereby incorporated by reference.

TECHNICAL FIELD

The present application relates to the technical field of adult products, and in particular to a massage device for females.

BACKGROUND

In recent years, various adult products have been developed to help users enhance their sexual experience. Generally, an existing massage device uses vibration motor(s) to provide high-frequency vibration to stimulate the user's body, particularly stimulate the sensitive areas of the body, such as the breast, the vulva, and etc., which has poor stimulation effect and thus is difficult to meet users'needs.

SUMMARY

An object of the present application is to provide a massage device which can provide better stimulation effect.

In order to achieve the above object, an embodiment of the present application provides a massage device, including a massage assembly and a driving assembly connected to the massage assembly, wherein the driving assembly includes:

a driving motor with an output shaft;

a rotary member mounted around the driving motor and connected to the output shaft of the driving motor, a first sliding groove being defined in an outer circumferential wall of the rotary member and extending spirally; and a fixed member mounted around the rotary member, a first sliding portion extending from the fixed member and engaging into the first sliding groove, the rotary member being movable and rotatable relative to the fixed member.

Further, an embodiment of the present application provides a massage device, including:

a main body defining a mounting space therein;

a driving assembly accommodated inside the mounting space; and a massage assembly provided at an end of the main body and connected to the driving assembly in a transmission manner;

wherein the massage assembly includes a first wall coupled to the end of the main body and a second wall surrounding the first wall, the first wall and the second wall cooperatively define a chamber for accommodating a part of a human body to be massaged therein, a tongue extending from a central portion of the first wall into the chamber; and wherein the driving assembly is configured to drive the tongue to rotate and the first wall to vibrate.

For the present massage device, the first wall of the massage assembly may produce a sucking effect on the human body and the tongue may mimic a process of tongue licking on the human body, which provides a more comfortable stimulation, and thus the users are more likely to reach orgasm.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

The present application provides a massage device for stimulate the human body. Referring to FIGS. 1-4, a massage device 100 according an embodiment of the present application is shown. The massage device 100 includes a main body 20, a driving assembly 30 mounted in the main body 20, and a massage assembly 40 provided at an end of the main body 20 and connected to the driving assembly 30 in a transmission way.

Figure 1:
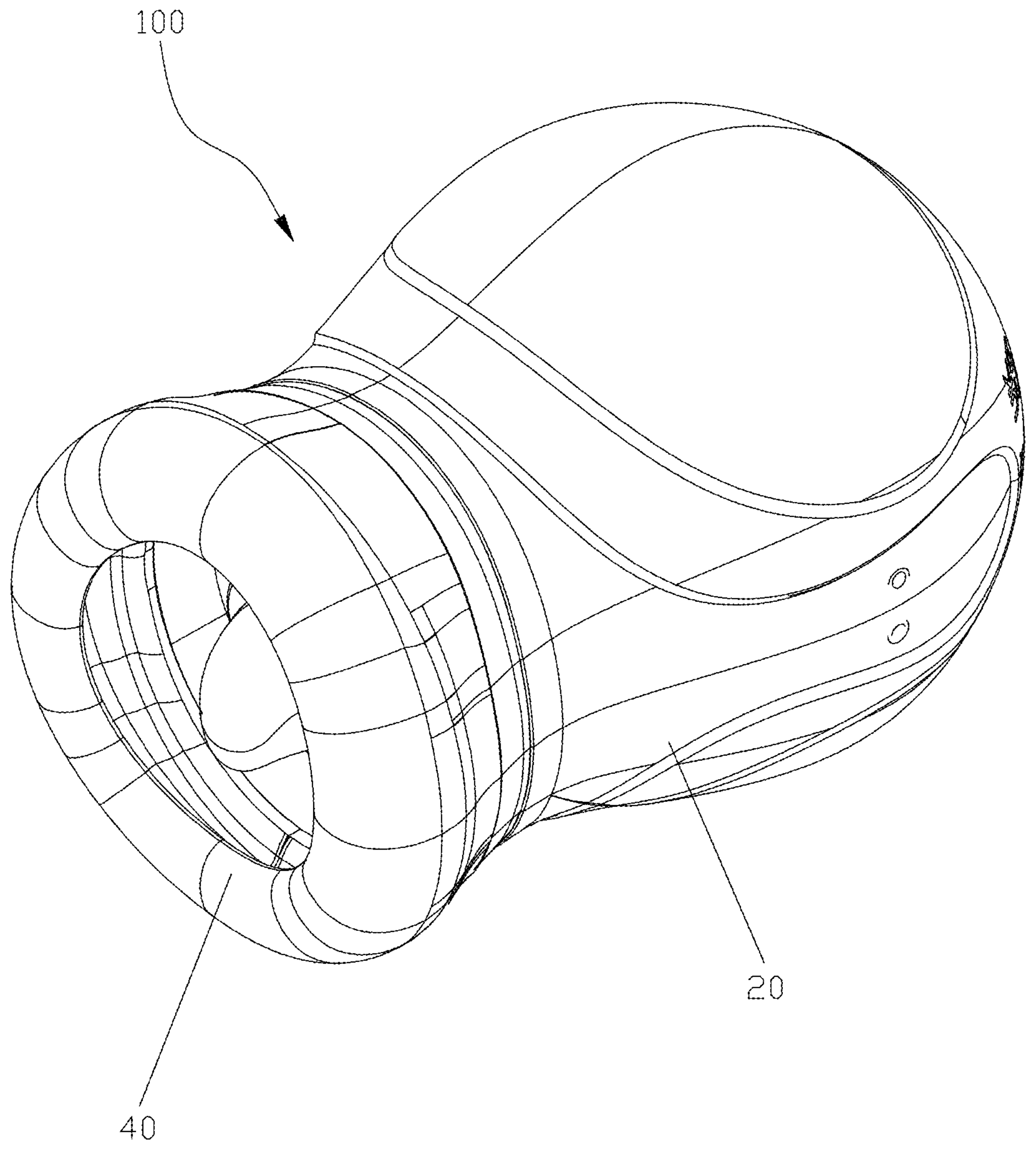
FIG. 1 is an isometric, assembled view of a massage device according to an embodiment of the present application.
Figure 2:
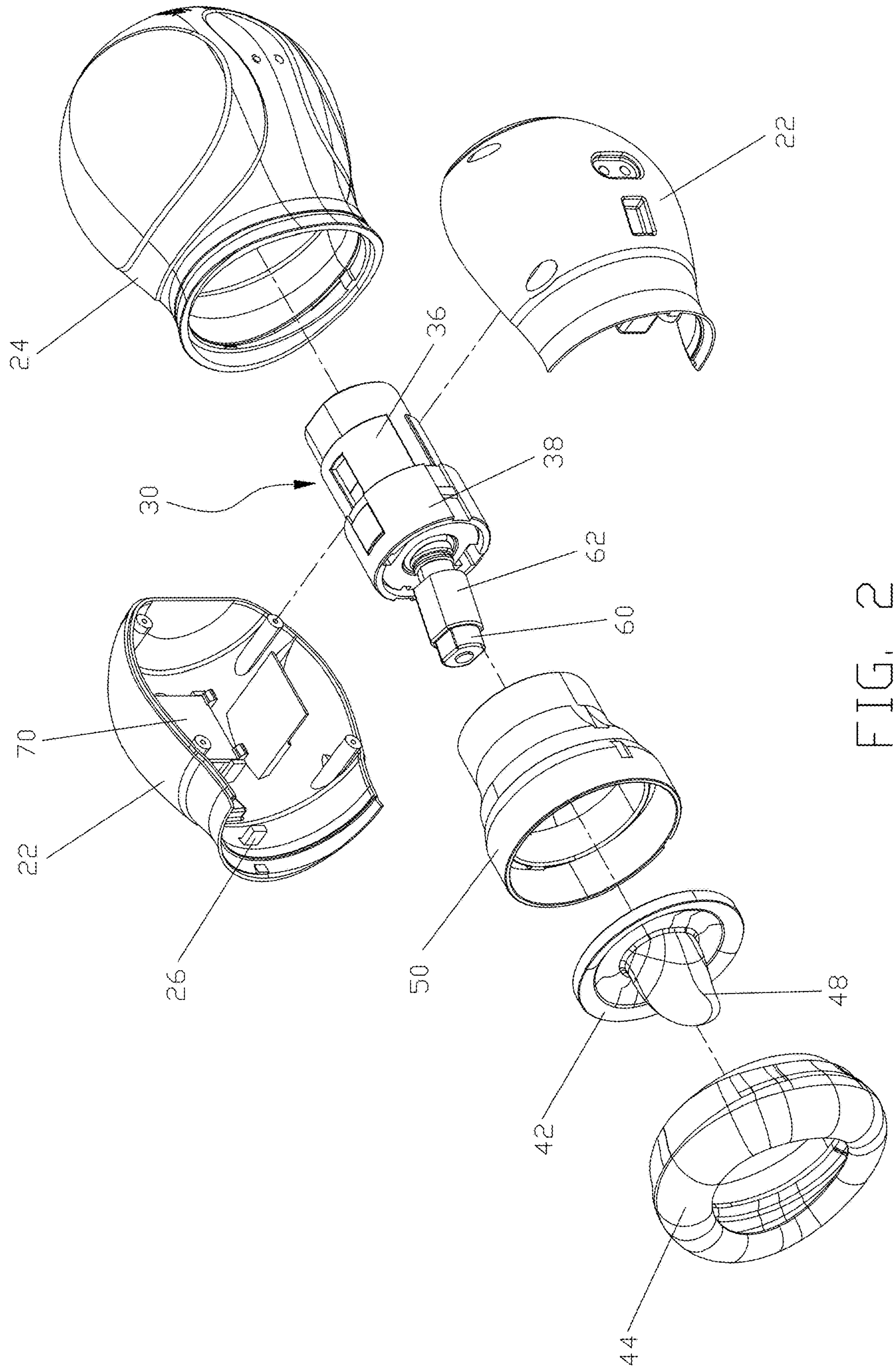
FIG. 2 is a schematic, exploded view of the massage device of FIG. 1.
Figure 4:
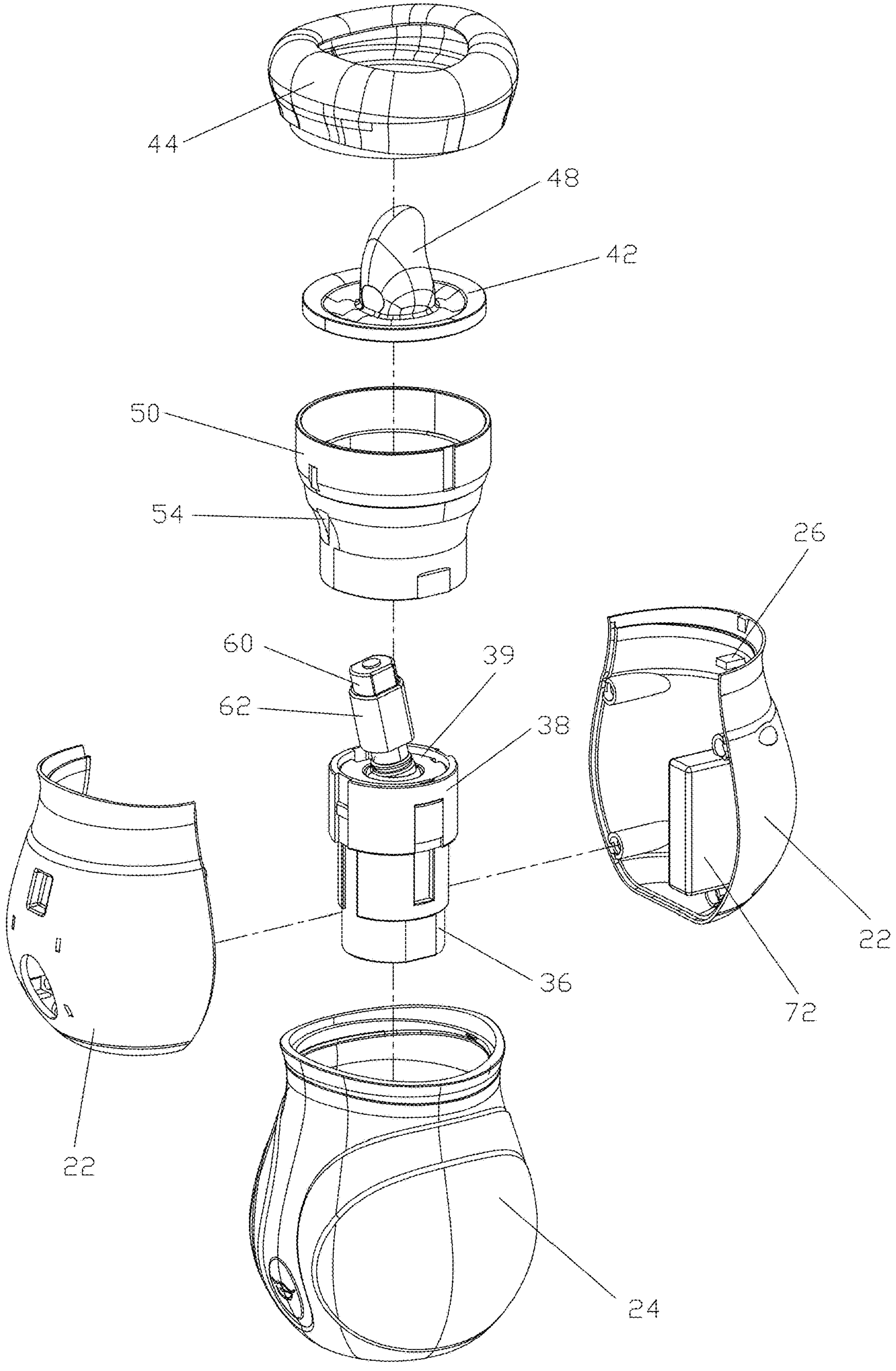
FIG. 4 is an exploded view of the massage device of FIG. 3.

Referring to FIG. 2 and FIG. 4, the massage assembly 40 includes a first wall 42 and a second wall 44. The first wall 42 is generally circular, coupled to a distal end of the main body 20. The second wall 44 is generally annular, extends from an outer periphery of the first wall 42 in a direction away from the main body 20. The first wall 42 and the second wall 44 cooperatively define a chamber 46 for accommodating a part of the human body to be massaged therein. The chamber 46 is not communicated with an interior of the main body 20.

A tongue 48 extends from a central portion of the first wall 42 into the chamber 46, wherein a distal end of the tongue 48 is substantially flush with that of the second wall 44. Generally, the massage assembly 40 simulates oral cavity of the human body, wherein the second wall 44 is similar to the mouth of the human body, and the tongue 48 is similar to the tongue of the human body. Preferably, the first wall 42 (including the tongue 48) and the second wall 44 both are made of flexible materials, such as silicone, rubber and the like.

Figure 6:
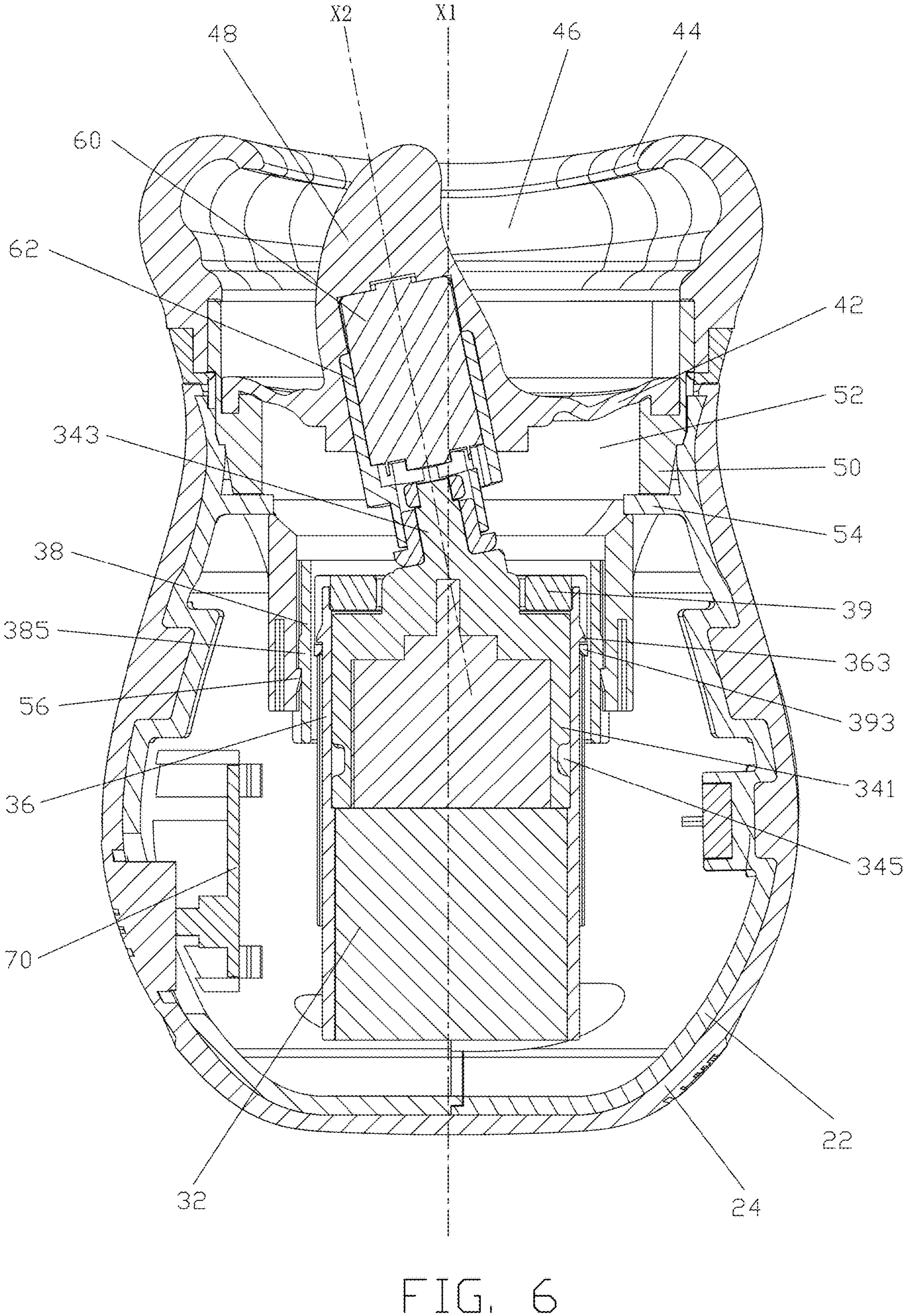
FIG. 6 is a cross sectional view of the massage device taken along line VI-VI of FIG. 5.
Figure 7:
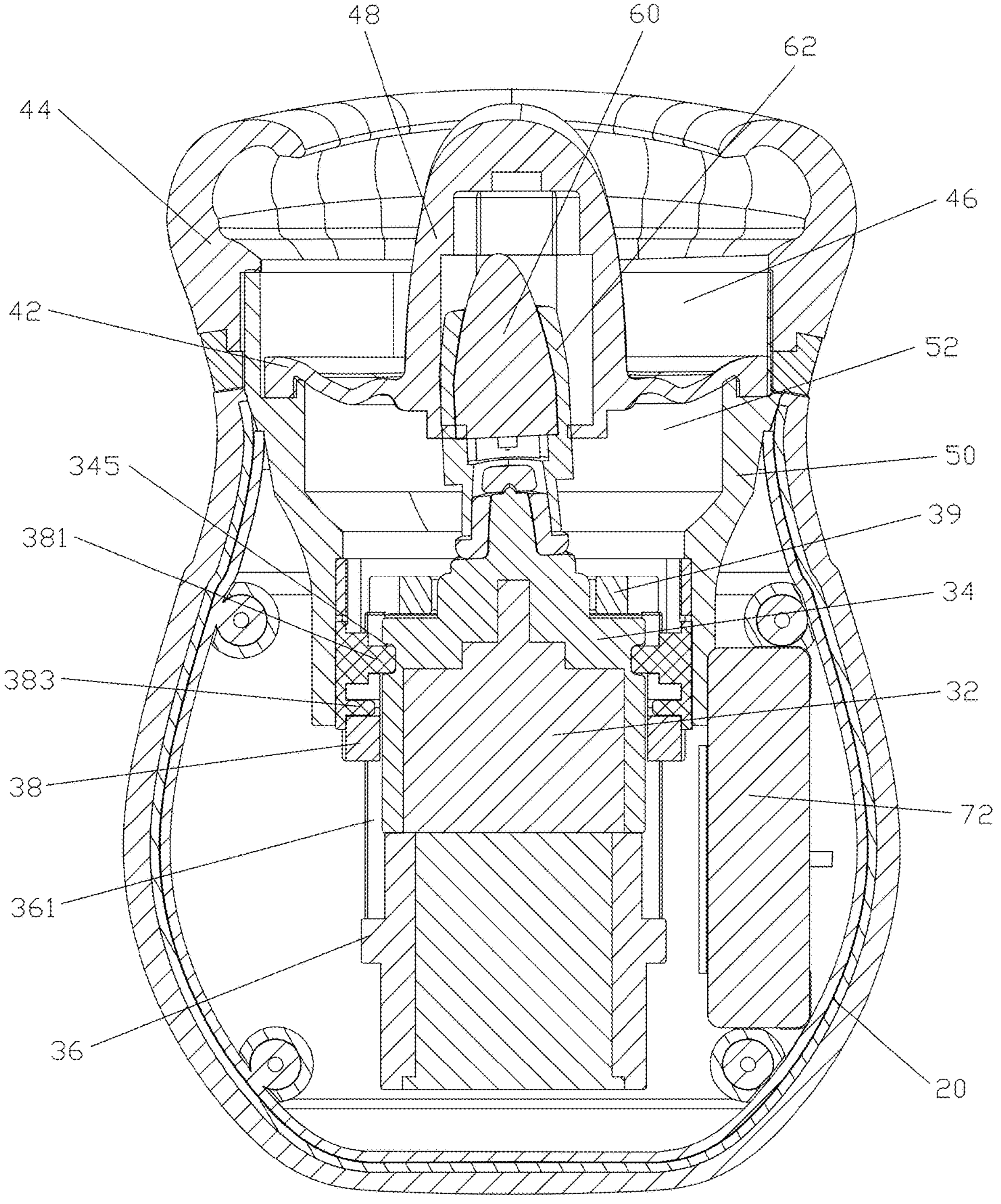
FIG. 7 is a cross sectional view of the massage device taken along line VII-VII of FIG. 5.
Figure 8:
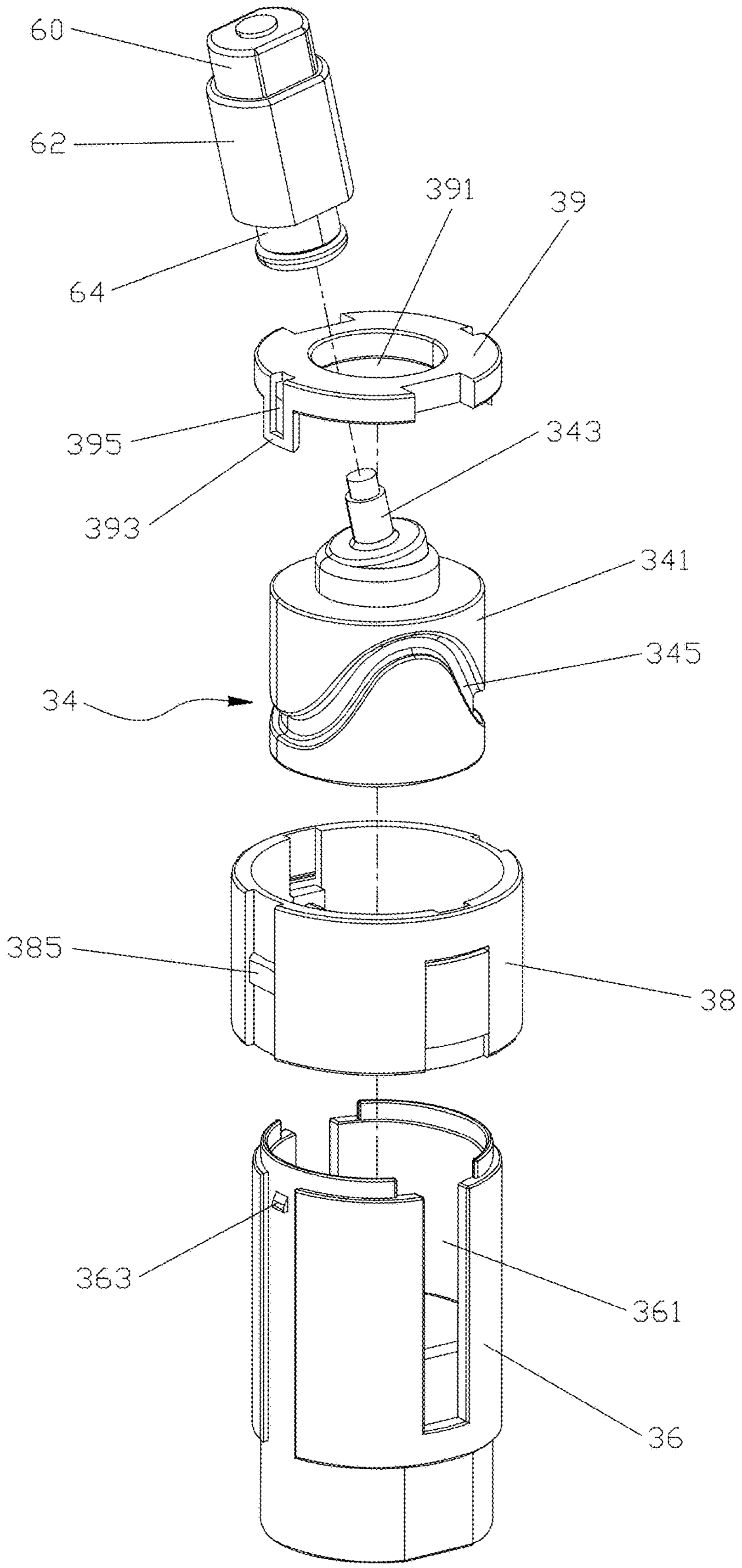
FIG. 8 is a further exploded view of a driving assembly of the massage device of FIG. 1.

Referring to FIGS. 6-8, the driving assembly 30 includes a driving member 32 and a rotary member 34 being driven to rotate about a rotary axis X1 by the driving member 32.

Figure 10:
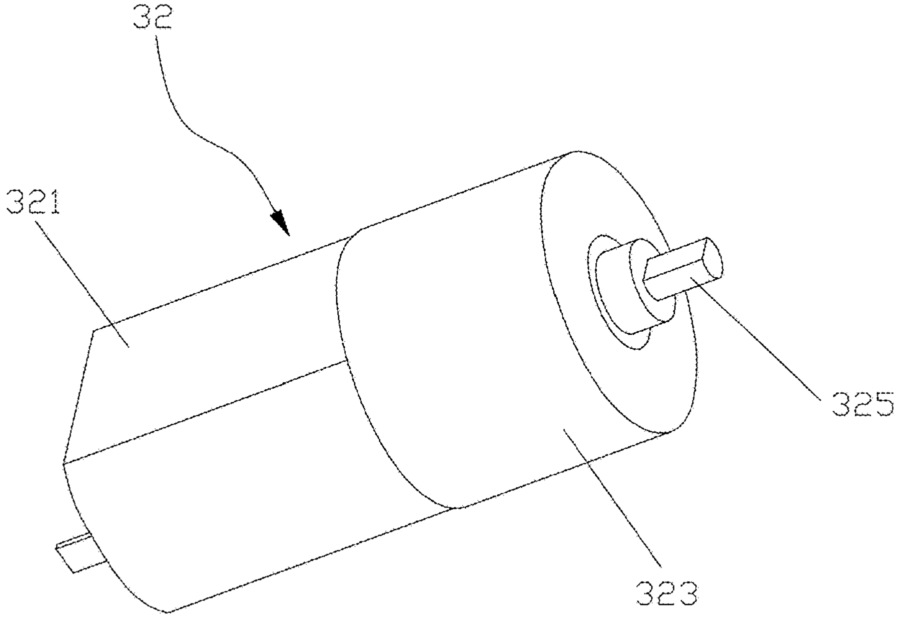
FIG. 10 is a schematic view of a driving member of the driving assembly.

Referring also to FIG. 10, the driving member 32 may be a rotary motor, or may be a gearbox consisted of a rotary motor 321 and a reduction gear unit 323. A speed of an output shaft 325 of the driving member 32 preferably does not exceed 1000 rpm. In this embodiment, a cross section of the output shaft 325 is generally D-shaped, making it be fixed to the rotary member 34 in the circumferential direction by shape fit. In other embodiment, the cross section of the output shaft 325 may be polygonal-shaped, elliptical-shaped, and etc.

The rotary member 34 includes a first rotary portion 341 connected to the output shaft 325 of the driving member 32, and a second rotary portion 343 extending obliquely from the first rotary portion 341. A central axis of the first rotary portion 341 is collinear with the rotary axis X1, and a central axis of the second rotary portion 343 is inclined relative to the rotary axis X1. The tongue 48 of the first wall 42 of the massage assembly 40 is connected to and rotates along with the second rotary portion 343.

In this embodiment, the first rotary portion 341 and second rotary portion 343 are integrally formed as one piece. In other embodiments, the first rotary portion 341 and second rotary portion 343 may be formed separately and then assembly together, which is not limited in this application.

The driving assembly 30 may further include a sliding member 36. The rotary member 34 is rotatable relative to the sliding member 36. A first sliding groove 345 is defined in an outer circumferential wall of the first rotary portion 341 of the rotary member 34, and a second sliding groove 361 is defined in the sliding member 36. The first sliding groove 345 extends spirally, while the second sliding groove 361 extends axially.

Figure 9:
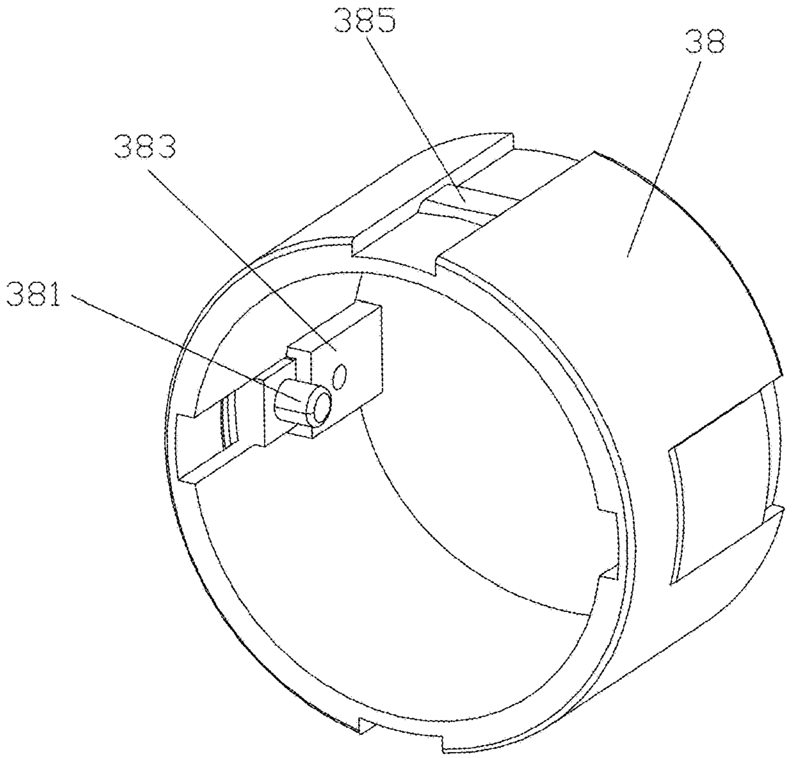
FIG. 9 is a schematic view of a fixed member of the driving assembly.

The driving assembly 30 may further include a fixed member 38. The fixed member 38 is fixed inside the main body 20, and the sliding member 36 is movable relative to the fixed member 38. As shown in FIG. 9, a first sliding portion 381 and a second sliding portion 383 are provided on the fixed member 38. The first sliding portion 381 is slidably engaged into the first sliding groove 345 of the rotary member 34, and the second sliding portion 383 is slidably engaged into the second sliding groove 361 of the sliding member 36.

The fixed member 38, the sliding member 36, and the first rotary portion 341 of the rotary member 34 cooperate with each other to form a conversion unit for converting rotation of the driving member 32 into reciprocating linear movement of the sliding member 36 along the rotary axis X1.

Figure 5:
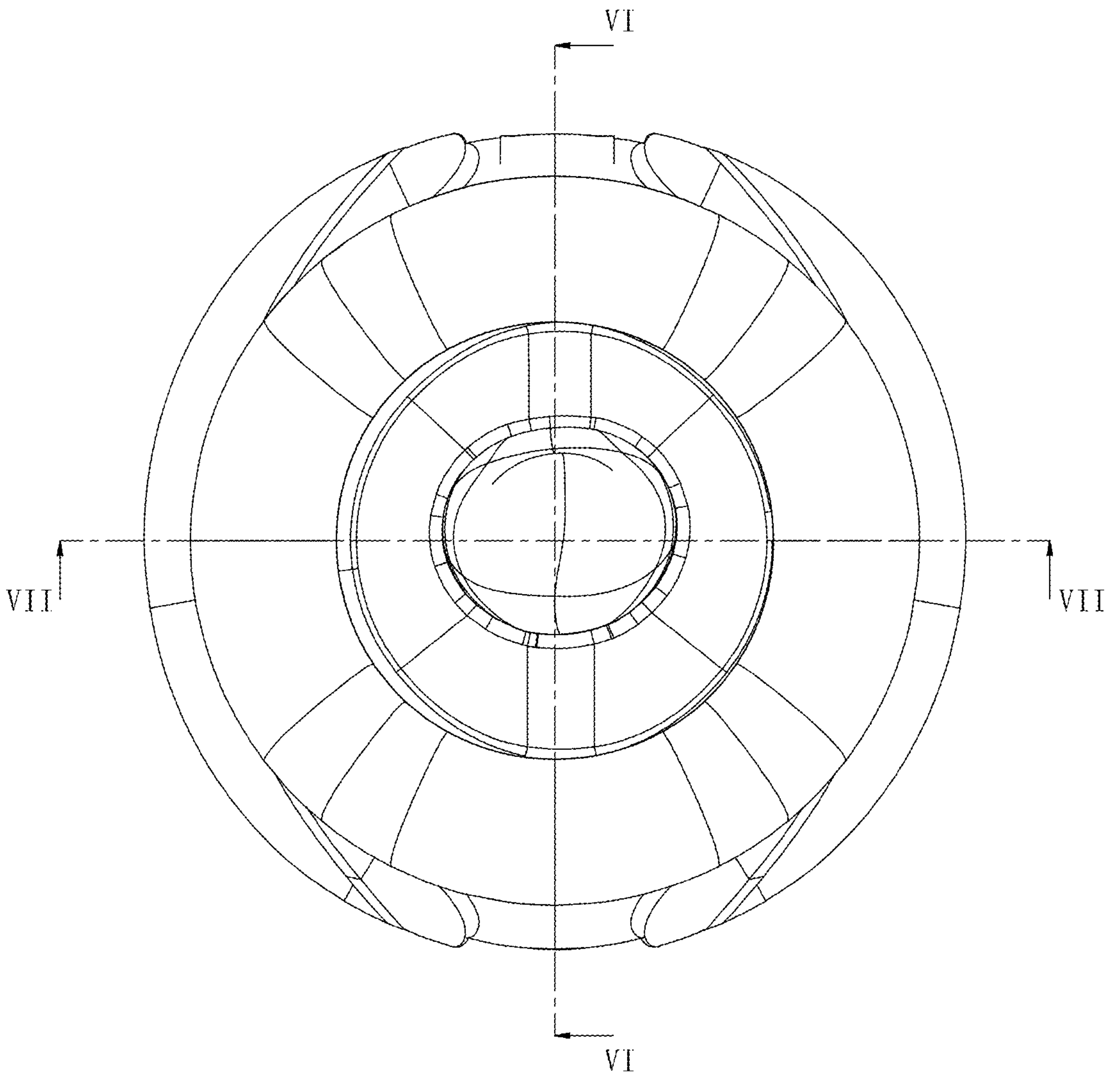
FIG. 5 is a front view of the massage device of FIG. 1.

In this embodiment, as shown in FIGS. 5-7, the first rotary portion 341 is generally cylindrical-shaped, and the driving member 32 extends partly into the first rotary portion 341 to reduce a length of the driving assembly 30 along the rotary axis X1. Specifically, the reduction gear unit of the driving member 32 is accommodated inside the first rotary portion 341 of the rotary member 34.

The sliding member 36 is also generally cylindrical-shaped, and mounted around the first rotary portion 341. In this embodiment, the sliding member 36 is fixed to a housing of the driving member 32, for example, through interference fit, shape fit, and etc. Thereby, the driving member 32 can move along with the sliding member 36.

In this embodiment, as shown in FIG. 8, a limit member 39 is set at an end of the first rotary portion 341 away from the driving member 32. An aperture 391 is defined in a central portion of the limit member 39 for extending of the second rotary member 34 therethrough. The limit member 39 is connected to the sliding member 36 to fix the rotary member 34 therebetween. Thus, the rotary member 34 can move along with the sliding member 36 axially.

Specifically, a locking portion 393 extends axially from an outer periphery of the limit member 39, and a locking hole 395 is defined in the locking portion 393. The sliding member 36 forms a locking tab 363 on an outer circumferential wall thereof, and the locking tab 363 engages into the locking hole 395 of the locking portion 393 to assemble the sliding member 36 and the limit member 39 together. That is, the sliding member 36, the rotary member 34 and the driving member 32 are fixed together along the rotary axis X1.

As shown in FIG. 7, the fixed member 38 is configured as a hollow cylinder and mounted around the sliding member 36. The first sliding portion 381 is generally rod-shaped, protruding inwardly and radially from the fixed member 38, extending through the second sliding groove 361 into the first sliding groove 345. The second sliding portion 383 is generally curved and sheet-like, protruding inwardly and radially from the fixed member 38 into the second sliding groove 361 for guiding the axial movement of the sliding member 36.

In this embodiment, the first sliding portion 381 and the second sliding portion 383 are integrally formed as one piece and then assembled to the fixed member 38, facilitating assembly of the fixed member 38 to the sliding member 36 and the rotary member 34. In other embodiments, the first sliding portion 381 and the second sliding portion 383 may be formed separately and then assembled onto the fixed member 38; or, the first sliding portion 381 and/or second sliding portion 383 may be integrally formed with the fixed member 38.

During operation, the rotary member 34 is driven to rotate about the rotary axis X1 by the driving member 32, the first sliding portion 381 engaged in the first sliding groove 345 of the first rotary portion 341 makes the fixed member 38 have a tendency to rotate about the rotary axis X1 and move along the rotary axis X1 for the spiral configuration of the first sliding groove 345.

However, the fixed member 38 is fixed inside the main body 20, which makes the first sliding portion 381 slides along the first sliding groove 345 and the second sliding portion 383 slides along the second sliding groove 361, causing the sliding member 36, the rotary member 34 and the driving member 32 move together relative to the fixed member 38 along the rotary axis X1, and the rotary member 34 to rotate relative to the fixed member 38 about the rotary axis X1. Thus, the rotation of the driving member 32 is converted into linear movement of the sliding member 36 along the rotary axis X1.

Preferably, the first sliding groove 345 of the first rotary portion 341 is axisymmetric about the rotary axis X1, and thus the sliding member 36 can move back and forth along the rotary axis X1.

In this embodiment, a sleeve 50 is provided inside the main body 20, with one end (such as a bottom end) connected to the fixed member 38 of the driving assembly 30, and another end (such as a top end) connected to the first wall 42 of the massage assembly 40. A sealed space 52 is defined among the first wall 42, the sleeve 50 and the driving assembly 30, which is not communicated with the chamber 46 at an exterior side of the first wall 42.

Specifically, the bottom end of the sleeve 50 is mounted around the fixed member 38, and preferably they are tightly fitted together; the top end of the sleeve 50 is mounted around the first wall 42, and preferably they are tightly fitted together. The fixed member 38 is partly accommodated inside the sleeve 50, further reducing the axial length of the massage device 100.

When the driving member 32 is started, along with the reciprocating linear movement of the sliding member 36, a volume of the sealed space 52 is changed. Specifically, when the sliding member 36 moves away from the first wall 42, the volume of the sealed space 52 is increased and accordingly a pressure inside the sealed space 52 is decreased, the first wall 42 is thus forced to concaved downwardly; when the sliding member 36 moves towards the first wall 42, the volume of the sealed space 52 is decreased and accordingly a pressure inside the sealed space 52 is increased, the first wall 42 is thus forced to protrude upwardly. Therefore, the first wall 42 thus acts as a vibrating diaphragm.

During use of the massage device 100, the second wall 44 is coupled onto a part of the human body that needs to be massaged. In this case, the chamber 46 is sealed by the human body. As the first wall 42 vibrates, a pressure inside the sealed chamber 46 is accordingly changed. Specifically, when the first wall 42 protrudes upwardly, the pressure inside the sealed chamber 46 is increased. Conversely, when the first wall 42 is concaved downwardly, the pressure inside the sealed chamber 46 is decreased. Therefore, the reciprocating linear movement of the sliding member 36 along the rotary axis X1 finally causes repeatedly pressure changes inside the sealed chamber 46, generating a sucking effect to the human body.

At the same time, the rotary member 34 rotates about the rotary axis X1, making the second rotary portion 343 revolve around the rotary axis X1, which in turn drives the tongue 48 connected to the second rotary portion 343 to revolve round the rotary axis X1, simulating the action of tongue licking to produce a licking effect on the human body.

Preferably, a central axis of the first wall 42 is collinear with the rotary axis X1, and a central axis X2 of the tongue 48 is inclined relative to the rotary axis X1. The distal end of the tongue 48 thus has a circular motion trajectory centered on the rotary axis X1, which can cover a larger licking range.

In this embodiment, a vibration motor 60 is accommodated inside the tongue 48. During operation, the vibration motor 60 can rotate along with the tongue 48, and the tongue 48 can vibrate along with the vibration motor 60 at a predetermined frequency, further enhancing the stimulation effect of the massage assembly 40.

As shown in FIG. 6 to FIG. 8, a mounting frame 62 may be provided in the tongue 48 for connecting the second rotary portion 343 of the rotary member 34. The mounting frame 62 may be made of rigid materials, such as plastic, metal and etc., which has a relatively high strength, not only providing stable connection for the rotary member 34 and the tongue 48, but also improving power transmission efficiency between the rotary member 34 and the tongue 48.

In this embodiment, the mounting frame 62 in whole is configured as a hollow cylinder, and the vibration motor 60 is partly received in the mounting frame 62 and partly received in the tongue 48. A mounting seat 64 protrudes outwardly from a bottom of the mounting frame 62 to receive the second rotary portion 343. The tongue 48 generally wraps around the mounting frame 62, so as to provide a stable connection therebetween, and thus the rotary member 34 can drive the tongue 48, the vibration motor 60 and the mounting frame 62 to rotate.

For the present massage device 100, the driving member 32 not only drives the tongue 48 to rotate through the rotary member 34, but also drives the first wall 42 to vibrate through the cooperation of the rotary member 34, the sliding member 36 and the fixed member 38, which can reduce the driving components for the massage device 100 and thus save costs.

During use of the massage device 100, the first wall 42 of the massage assembly 40 may produce a sucking effect on the human body under the driving of the driving member 32; the tongue 48 of the first wall 42 may produce a vibration effect on the human body under the driving of the vibration motor 60 and mimics a process of tongue licking on the human body under the driving of the driving member 32, which provide a more comfortable stimulation.

When the above massage device 100 is used to stimulate sensitive parts of the human body, such as the breasts and the genitalia, the users are more likely to reach orgasm. For example, the second wall 44 may be coupled onto the breast with the tongue 18 in contact with the nipple; or, the second wall 44 may be coupled onto the vulva with the tongue 18 in contact with the clitoris. It should be understood that the present massage device 100 may also be used to stimulate other parts of the human body, which are not listed here.

As shown in FIG. 6 and FIG. 7, in this embodiment, the main body 20 in whole is configured as a ball, preferably being a double layer structure. Specifically, the main body 20 includes an inner layer 22 made of rigid materials, such as plastic, metal and the like, and an outer layer 24 made of flexible materials, such as silicone, rubber and the like. The inner layer 22 provides supports for the driving assembly 30, and the outer layer 24 provides soft touch for the users.

The sleeve 50 may be fixed to the inner layer 22 by engagement of ears 26 of the inner layer 22 into the holes 54 of the sleeve 50, and the fixed member 38 may be fixed to the sleeve 50 by engagement of hooks 56 of the sleeve 50 with the blocks 385 of the fixed member 38.

In this embodiment, a circuit board 70 is provided inside the main body 20 and electrically connected to the electronic components of the massage device 100, such as the vibration motor 60, the driving member 32, and etc. A battery 72, preferably a rechargeable battery, is arranged in the main body 20 and electrically connected to the circuit board 70 for supplying electric power to the electric components inside the main body 20.

Figure 3:
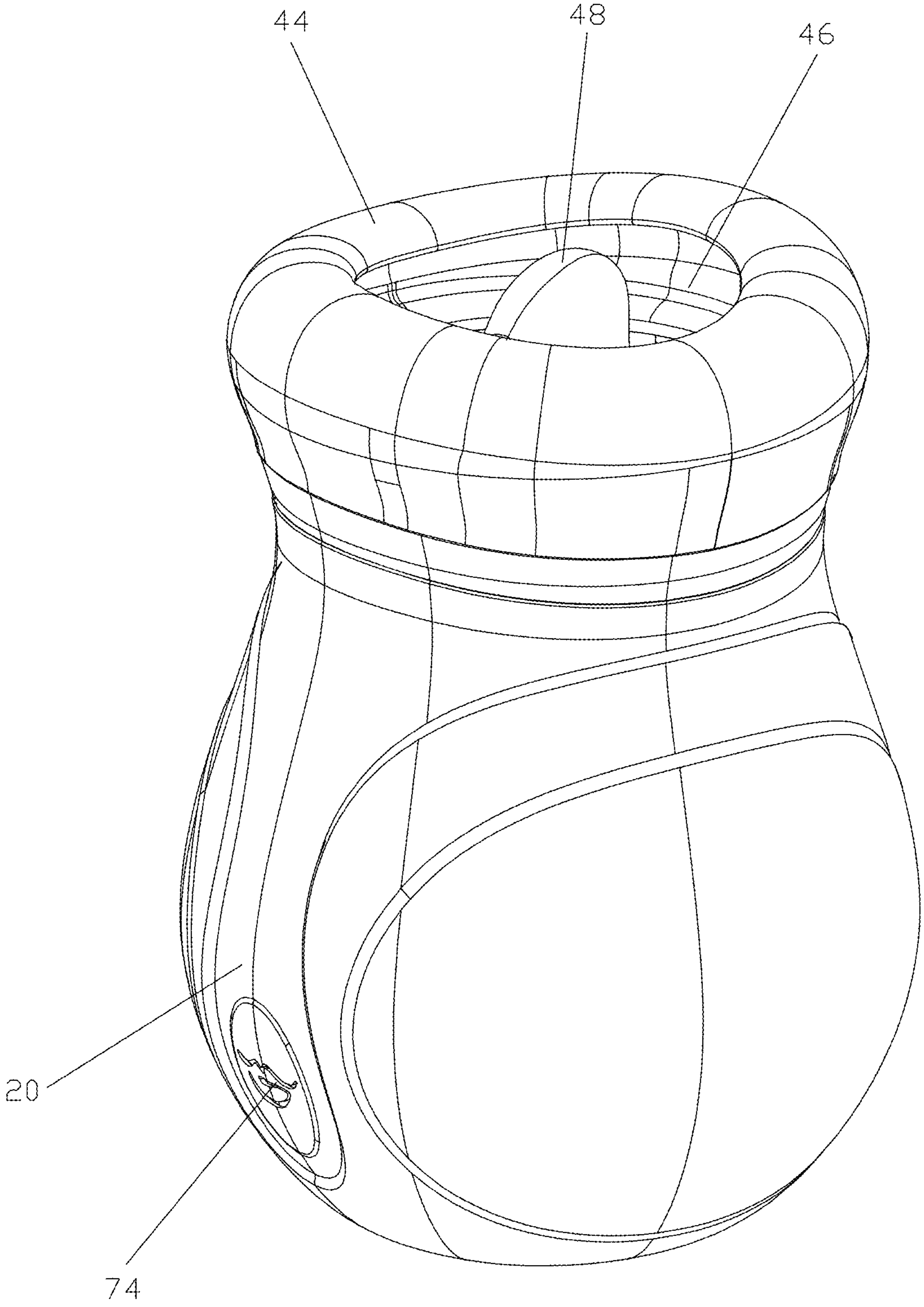
FIG. 3 shows the massage device of FIG. 1 from another aspect.

As shown in FIG. 3, buttons 74 are provide on the main body 20 and electrically connected to circuit board 70. The buttons 74 may be mechanical buttons or touch buttons, configured for input the user's instructions, so that the operation of the massage device 100 can be controlled according to the user's instructions.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A massage device comprising a massage assembly and a driving assembly connected to the massage assembly, wherein the driving assembly comprises:

a driving motor with an output shaft;

a rotary member mounted around the driving motor and connected to the output shaft of the driving motor, a first sliding groove being defined in an outer circumferential wall of the rotary member and extending spirally; and a fixed member mounted around the rotary member, a first sliding portion extending from the fixed member and engaged into the first sliding groove, the rotary member being movable and rotatable relative to the fixed member.

2. The massage device according to claim 1, wherein a sliding member is mounted around the rotary member, a second sliding groove is defined in the sliding member and extends axially; the fixed member is mounted around the sliding member, and the first sliding portion extends through the second sliding groove of the sliding member into the first sliding groove of the rotary member.

3. The massage device according to claim 2, wherein the fixed member further comprises a second sliding portion engaging into the second sliding groove to guide axial movement of the sliding member relative to the fixed member.

4. The massage device according to claim 2, wherein the sliding member is fixedly connected to the driving motor.

5. The massage device according to claim 4, wherein a limit member is set at an axial end of the rotary member which is away from the driving motor, the sliding member is connected to the limit member to fix the rotary member and the sliding member together in an axial direction.

6. The massage device according to claim 5, wherein the limit member comprises a locking portion configured with a locking hole, and the sliding member comprises a locking tab engaged into the locking hole to fix the sliding member and the limit member together.

7. The massage device according to claim 1, wherein the rotary member comprises a first rotary portion and a second rotary portion extending obliquely from an end of the first rotary portion, the first rotary portion is cylindrical-shaped and mounted around the driving motor, the first sliding groove is defined in an outer circumferential wall of the first rotary portion, and the massage assembly is connected to the second rotary portion.

8. The massage device according to claim 7, wherein the massage assembly comprises a first wall and a tongue extending from a central portion of the first wall, the second rotary portion is connected to the tongue, and the fixed member is connected to an outer periphery of the first wall through a sleeve.

9. The massage device according to claim 8, wherein a sealed space is defined among the first wall, the sleeve and the driving assembly, reciprocating linear movement of the sliding member makes the first wall vibrate to generate a sucking function, and rotation of the rotary member makes the tongue rotate to generate a licking function.

10. The massage device according to claim 8, wherein a vibration motor is accommodated inside the tongue.

11. The massage device according to claim 1, further comprising a main body defining a mounting space to accommodate the driving assembly therein;

wherein the massage assembly is provided at an end of the main body and comprises a first wall coupled to the end of the main body and a second wall surrounding the first wall, the first wall and the second wall cooperatively define a chamber for accommodating a part of a human body to be massaged therein, a tongue extending from a central portion of the first wall into the chamber; and wherein the driving assembly is configured to drive the tongue to rotate and the first wall to vibrate.

12. The massage device according to claim 11, wherein a vibration motor is accommodated inside the tongue.

13. The massage device according to claim 11, wherein at least a portion of the first wall around the tongue is wave-shaped.

14. The massage device according to claim 11, wherein a central axis of the tongue is inclined relative to a central axis of the first wall.

15. The massage device according to claim 11, wherein both the first wall and the second wall are flexible.

16. The massage device according to claim 11, wherein a sleeve is fixed inside the main body with one end connected to the first wall and another end connected to the driving assembly, a sealed space is defined among the first wall, the sleeve and the driving assembly, and the chamber is not communicated with the sealed space.

17. The massage device according to claim 16, wherein the rotary member is configured with a first rotary portion connected to the output shaft of the driving motor and a second rotary portion connected to the tongue.

18. The massage device according to claim 17, wherein the driving assembly further comprises a sliding member, the fixed member is connected to the sleeve, the sliding member is inserted into the fixed member and movable relative to the fixed member, and the rotary member is inserted into the sliding member and rotatable relative to the sliding member.

19. The massage device according to claim 18, wherein a hook is provided on the sleeve, a block is provided on the fixed member, and the hook is engaged with the block to fix the fixed member and the sleeve together.

20. The massage device according to claim 16, wherein the main body is provided with an ear, the sleeve is provided with a hole, and the ear is inserted into the hole to fix the sleeve inside the main body.

* * * * *